US007978889B2

(12) United States Patent
Valdiserri et al.

(10) Patent No.: US 7,978,889 B2
(45) Date of Patent: Jul. 12, 2011

(54) AUTOMATIC ENGINE FOR 3D OBJECT GENERATION FROM VOLUMETRIC SCAN DATA AND METHOD

(76) Inventors: Michael Valdiserri, Tucson, AZ (US); Warren J. Goble, Tucson, AZ (US)

( * ) Notice: Subject to any disclaimer, the term of this patent is extended or adjusted under 35 U.S.C. 154(b) by 1162 days.

(21) Appl. No.: 11/668,272

(22) Filed: Jan. 29, 2007

(65) Prior Publication Data

US 2007/0177784 A1 Aug. 2, 2007

Related U.S. Application Data

(60) Provisional application No. 60/762,916, filed on Jan. 27, 2006.

(51) Int. Cl.
*G06K 9/00* (2006.01)

(52) U.S. Cl. ........................................................ 382/128

(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS

| 4,751,643 | A * | 6/1988 | Lorensen et al. | 382/132 |
|---|---|---|---|---|
| 6,088,473 | A * | 7/2000 | Xu et al. | 382/132 |
| 2002/0069043 | A1* | 6/2002 | Agrafiotis et al. | 703/22 |
| 2005/0207628 | A1* | 9/2005 | Kim | 382/128 |
| 2006/0023966 | A1* | 2/2006 | Vining | 382/260 |
| 2007/0140541 | A1* | 6/2007 | Bae et al. | 382/131 |
| 2010/0208872 | A1* | 8/2010 | Karellas | 378/98.8 |

OTHER PUBLICATIONS

Starck, Jean-Luc, et al, The Curvelet Transform for Image Denoising, Nov. 15, 2000, pp. 1-27.

Okada, Kazunori, et al., Scale Selection for Anisotropic Scale-Space: Application to Volumetric Tumor Characterization, pp. 1-8, Jul. 2, 2004.

Okada, Kazunori, et al., Robust 3D Segmentation of Pulmonary Nodules in Multislice CT Images, pp. 1-8, Sep. 29, 2004.

Foran, David, et al., Computer-Assisted Discrimination Among Malignant Lymphomas and Leukemia Using Immunophenotyping, Intelligent Image Repositories, and Telemicroscopy, pp. 265-273, Dec. 2000.

Comaniciu, Dorin, et al., Robust Analysis of Feature Spaces: Color Image Segmentation, pp. 1-8, Jun. 19, 1997.

Tek, Huseyin, et al., Segmentation of 3D Medical Structures using Robust Ray Propagation, pp. 1-8, Sep. 28, 2002.

Tek, Huseyin, et al., Vessel Detection by Mean Shift Based Ray Propagation, pp. 1-8, Dec. 7, 2001.

* cited by examiner

*Primary Examiner* — Samir A Ahmed
*Assistant Examiner* — Atiba O Fitzpatrick
(74) *Attorney, Agent, or Firm* — Greenberg Traurig, LLP

(57) ABSTRACT

A method of generating a 3 dimensional object includes providing a volumetric scan of a study object as a series of image slices. An image segmentation algorithm is used to image segment each image slice into at least a first region and a second region, the first region of each image slice corresponds to a first object of the study object, and the second region of each image slice corresponds to a second object of the study object. The first region is selected from a first image slice. Regions of adjacent image slices are statistically compared to the first region using a comparison of touching regions to designate corresponding first regions in the adjacent image slices. The first region of each image slice of the series corresponding to the first object is binned to form a first binned object. A 3 dimensional object of the first binned object is formed.

12 Claims, 2 Drawing Sheets

US 7,978,889 B2

AUTOMATIC ENGINE FOR 3D OBJECT GENERATION FROM VOLUMETRIC SCAN DATA AND METHOD

CROSS-REFERENCE TO RELATED APPLICATION

This application claims the benefit of U.S. Provisional Application No. 60/762,916 filed 27 Jan. 2006.

FIELD OF THE INVENTION

This invention relates to the generation of 3D objects.

More particularly, the present invention relates to generation of 3D objects from volumetric scan data (i.e., MRI, CT, PET, SPECT, X-Ray, etc.).

BACKGROUND OF THE INVENTION

Volumetric scans such as CAT scans, PET scans, CT scans, MRI scans, Ultrasound scans, Laser 3D scanners, and the like are commonly used, particularly in the medical industry, to observe objects within a structure that would otherwise be unobservable. These scans have greatly advanced the capability of professionals such as doctors. They, however, remain limited in that while they are scans of a three dimensional object the images produced are image slices that are two dimensional. Thus, an individual must page through multiple image slices and view a three dimensional object in multiple two dimensional images. This can lead to misinterpretation of data and errors in diagnosis and treatment.

It would be highly advantageous, therefore, to remedy the foregoing and other deficiencies inherent in the prior art.

Accordingly, it is an object of the present invention to provide a new and improved method of generating 3-dimensional objects from volumetric scan data.

SUMMARY OF THE INVENTION

Briefly, to achieve the desired objects of the instant invention in accordance with a preferred embodiment thereof, provided is a method of generating a 3 dimensional object. The method includes providing a volumetric scan of a study object as a series of image slices. Each image slice is segmented into at least a first region and a second region, the first region of each image slice corresponds to a first object of the study object, and the second region of each image slice corresponds to a second object of the study object. The first region of each image slice of the series of image slices corresponding to the first object is binned to form a first binned object. The second region of each image slice of the series of image slices corresponding to the second object is binned to form a second binned object. A 3 dimensional object of one of the first binned object and the second binned object is formed.

The desired objects are further achieved through a specific method of generating a 3 dimensional object. The method includes providing a volumetric scan of a study object as a series of image slices. Automatic image segmentation algorithms are used to image segment each image slice into at least a first region and a second region, the first region of each image slice corresponds to a first object of the study object, and the second region of each image slice corresponds to a second object of the study object. The first region is selected from a first image slice. Regions of adjacent image slices are statistically compared to the first region of the first image slice using a comparison of touching regions to designate corresponding first regions in the adjacent image slices. The first region of each image slice of the series of image slices corresponding to the first object is binned to form a first binned object. A 3 dimensional object of the first binned object is formed.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

A preferred embodiment of the present invention includes a process engine whereby volumetric scan data is automatically compiled, sorted and processed to form a three-dimensional object. As used in this description, and well known to those skilled in the art, a 3D object is data used by a computer to form a 3 dimensional surface mesh. Typically this includes a plurality of triangles joined to form a surface representing an object which may or may not be a real world object. The formation of three-dimensional objects utilizing the engine and process of the present invention is contemplated as being employed in various applications such as representations, medical imaging applications, medical surgical applications, such as surgical simulations, bioinformatics, data-basing, data-analytics, animations in legal proceedings, or other medical applications. The use of volumetric scan data to generate three-dimensional objects provides for accurate representation of actual real-world objects.

Figure 1:
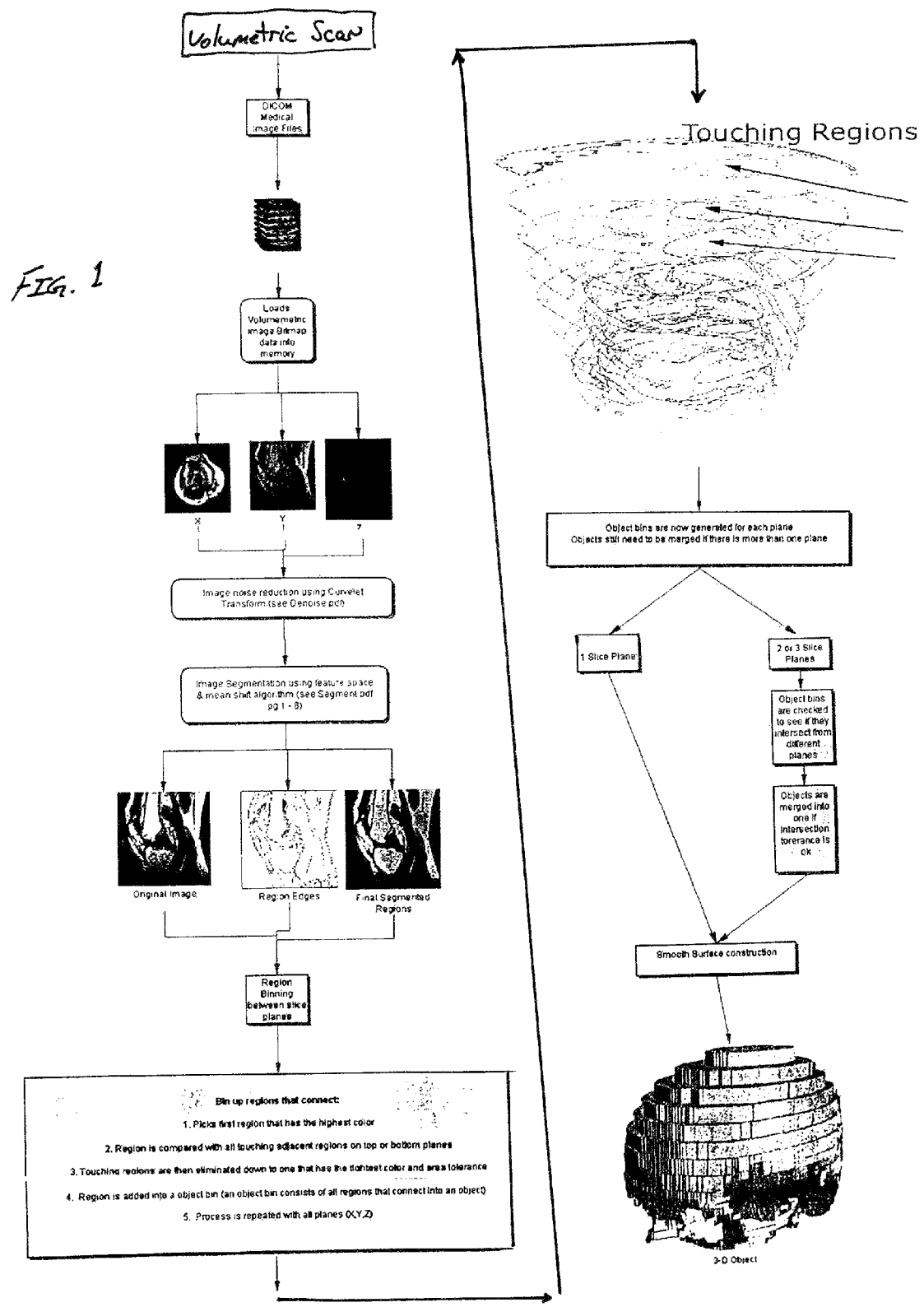
FIG. 1 is a block diagram illustrating the process of 3D object iamge generation of the present invention.
Figure 2:
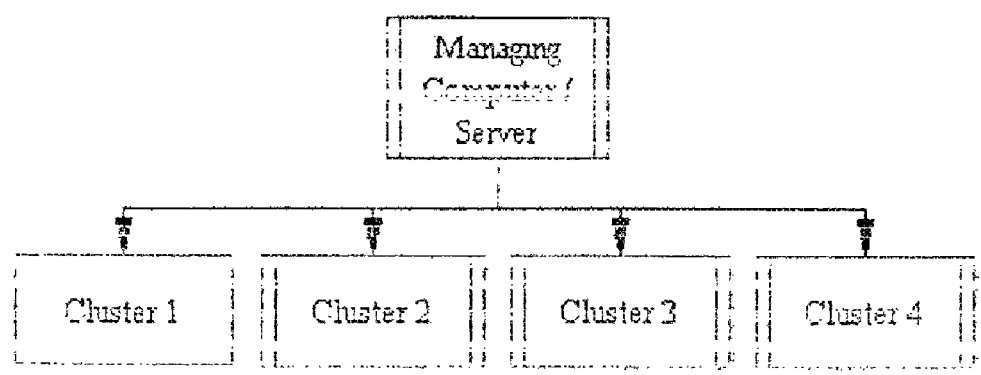
FIG. 2 is a block diagram of an engine using parallel processing.

Turning now to the drawings in which like reference characters indicate corresponding elements throughout the several views, attention is first directed to FIG. 1, which is a block diagram illustrating the steps involved in the process of automatically generating 3-D objects according to the present invention. The first step in the process is obtaining volumetric scan data. Volumetric scan data can be obtained by using volumetric scanning devices such as CAT scans, PET scans, CT scans, MRI scans, Ultrasound scans, Laser 3D scanners, and the like. The data generated by volumetric scanning devices can come in a variety of forms. In medical data it is typically provided in the form of a specified standard called DICOM (digital imaging and communications in medicine). Volumetric scan data is typically organized in a study, or record like a patient's medical record, of a real world object such as animate objects, an individual's leg or portion thereof, or inanimate objects. For purposes of this disclosure, an object that has been volumetrically scanned will be referred to as a study object typically composed of multiple objects. The study includes a plurality of images. The images are typically image slices forming a stack (series). The study can include a single series of image slices taken along a single plane or multiple series, each series including multiple image slices (2 dimensional) and each series taken along a different plane. While any number of planes can be employed, typically scans are taken along lateral, sagittal, and coronal planes (i.e., X, Y, & Z planes). It should be understood that the term volumetric scan as used herein refers to scans of three dimensional study objects collected in a series of two dimensional image slices.

As previously discussed, volumetric scan data can be provided in various formats, but in the preferred embodiment this includes DICOM files, as DICOM is the standard typically employed. The DICOM files are loaded into storage devices such as computer memory, or removable media, for processing according to the present invention. DICOM data is usually very scattered and is automatically organized during the loading process. The scattered DICOM files are passed to the engine which parses out the studies and series of data. Usually DICOM data is scattered throughout multiple files with each file containing one image. The process employed by the engine includes collection of data, which begins with matching files by a series of numbers called a UID. An example of a UID is 1.2.840.113619.2.30.1.1762289177.2046.1060966948.912. A study object such as all or part of a particular patient will have a unique UID. The UID will be the same for each image in a series. First a directory where all the study objects image data is stored is selected. Next, every file is loaded into storage and checked to see if it is a DICOM file. This is accomplished by checking its header. If the file is a DICOM file the UID for the series is checked. If the UID matches a previous UID, that image is added into a bin for all matching UID's for a series of images. In essence, the image series UID is matched, and all images with the UID are binned or otherwise stored in association. It should be understood that bin or binning refers to storing associated data in a file or like designated storage area as a collection or group of data.

Once properly sorted and stored, image noise reduction is performed. Image noise reduction can be performed using a variety of algorithms known to those skilled in the art. Among those algorithms which can be used are Fast Fourier Transform, Curvelet Transform, Gaussian Transform, and the like. In this manner, each series of images is passed through a filter routine to eliminate any noise in the images for more accurate image segmentation.

The next step in the process is image segmentation. Each image slice in a series is segmented using image segmentation algorithms. It will be understood by those skilled in the art that various image segmentation algorithms can be employed, such as Feature Space & Mean Shift Algorithms, Graph-Based Algorithms, and the like. Image segmentation allows each image slice to be divided into multiple regions, each region being a closed segment of color, or gray scale, representing a contour of an object within the study object. The regions of adjacent image slices are compared to determine regions which are likely from the same object.

By image segmentation, each image slice has been divided into regions. Binning of these regions becomes a statistical task. After segmentation every image slice is left with a set of regions representing areas segmented by color which includes gray scale. Image slice regions are compared with the regions of neighboring (adjacent) image slices in the series stack. This task preferably starts out by selecting a region, for example a region with the largest area. Recursively all regions on adjacent image slices that are connected with, for example touching on the top and bottom plane of the stacked series, the selected region are then statistically compared based on size of area, color of region and connecting or touching area of region. This process occurs for all image slices and regions. Regions that fit within a tolerance are then binned into an objects region bin and then flagged as used. The areas of tolerance can be checked, and estimates of error can be calculated and reduced, by a variety of algorithms known to those skilled in the art, such as Mean-Shift comparisons, Nested model comparisons, Fit Indices, Baysian Analyses, Structural Equations Modeling, Hierarchical Partitioning of Variance, Regression analyses, growth-curve analyses, factor analyses, and meta-analytic comparisons. This process is repeated by selecting all connected regions and repeating this process until all regions are flagged as used. The result is a collection of regions (binned object) from each image slice of a series corresponding to an object of the study object. One skilled in the art will understand that when images are segmented into regions during the process of binning the regions to form a binned object, images can contain multiple regions that correspond to the same object. For example, a bone may diverge at some point in the image series into two projections. In this case, for example, the two projections of bone correspond to two different regions in an image slice, but the two regions are binned for the same binned object.

Binning of multiple planes is also another statistical task. First all image series for the different planes such as X, Y, Z each have all their regions binned, as described previously, into binned objects corresponding to objects of the study object. Next the intersections of all binned objects are checked to determine what regions corresponding to objects are touching or colliding. If the binned regions of a binned object intersect with another set of binned regions of a binned object on a different plane, the area intersecting the binned object's volume, center of area, and color is statistically checked to determine if the binned object is within tolerance. If the intersecting binned object is within tolerance then the intersecting binned object is merged. This process is repeated until all binned objects have been compared.

Each binned object (consisting of corresponding regions from the image slices of one or more series) is then utilized to form a 3D object also called a 3D surface mesh. Various known processes or algorithms can be used to form the surface meshes from the binned object data, such as Marching Cubes, Marching Triangles, Edge Spinning, Implicit Surface Reconstruction, and the like. Once formed, these generated 3D objects can be utilized in various manners as desired, and can be used as objects in, or referenced to objects in, pending US Patent Application entitled "Interactive 3-Dimensional Object Oriented Database Information Storage/Retrieval System" Ser. No. 10/982,276, herein incorporated by reference and can be used in data analysis and comparisons. For example a rendered digital object can be compared to a data base of a plurality of similar objects for data analysis, comparison and prediction.

The process described herein can be encompassed by a computing engine which may consist of a plurality of computers. For example, all series of images can be divided from the DICOM files and passed to a cluster of computers to segment the images using the Feature Space & Mean Shift Algorithms, Graph-Based Algorithms, and the like. Thus, parallel processing can greatly speed the generation process. Data is then passed back to the managing computer and sorted again to be passed to a cluster of computers for region binning on objects. Regions are then processed using statistical algorithms to best match the connected regions. Connected regions are then binned into an object bin which is passed back to the managing computers. The managing computers divide object bins and pass them to the cluster of computers to build smooth surfaces around the regions. Objects are then passed back as surface meshes or three-dimensional objects. Again processing of objects from multiple planes is done over a scalable cluster of computers by sending the surface meshes to the cluster to match and refine the surfaces. The result is then passed back as a single object or a group of objects such as bone, muscle and tissue, automatically. This illustrates that processing intensive tasks can be broken out and passed off to the cluster for processing. The cluster is scalable, meaning computers can be added to the cluster to improve on performance. Processing intensive processes which would benefit from using a cluster include, image segmentation, binning of regions, binning of multiple planes, surface generation, error correction, and statistical analyses. The cluster can also be scalable with more tasks that can be developed in the future. As an example, image segmentation is passed to the cluster as a standard image bitmap. The bitmap is then segmented and the data is passed back to the server as regions.

The invention has been described above with reference to preferred embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method of generating a 3 dimensional object comprising the steps of:
    providing a volumetric scan of a study object as a series of image slices;
    image segmenting each image slice into at least a first region and a second region, the first region of each image slice corresponds to a first object of the study object, and the second region of each image slice corresponds to a second object of the study object;
    binning the first region of each image slice of the series of image slices corresponding to the first object to form a first binned object;
    binning the second region of each image slice of the series of image slices corresponding to the second object to form a second binned object;
    forming a 3 dimensional object of one of the first binned object and the second binned object; wherein
    the segmenting, binning, and forming a 3 dimensional object are performed by a computing engine including at least one cluster of computers and a managing computer, for parallel processing.

2. A method as claimed in claim 1 wherein the step of binning the first region includes selecting the first region from a first image slice and statistically comparing regions of adjacent image slices to the first region of the first image slice using a comparison of touching regions and at least one of size, and color to designate corresponding first regions in the adjacent image slices.

3. A method as claimed in claim 2 wherein the step of binning the first region includes statistically comparing regions of adjacent image slices of the entire series.

4. A method as claimed in claim 3 wherein the step of statistically comparing regions includes areas of tolerance and binning regions within the areas of tolerance.

5. A method as claimed in claim 4 wherein the areas of tolerance are checked and estimates of errors are calculated and reduced using an algorithm.

6. A method as claimed in claim 5 wherein the algorithm is selected from a group consisting of Mean-Shift comparisons, Nested model comparisons, Fit Indices, Baysian Analyses, Structural Equations Modeling, Hierarchical Partitioning of Variance, Regression analyses, growth-curve analyses, factor analyses, and meta-analytic comparisons.

7. A method of generating a 3 dimensional object comprising the steps of:
    providing a plurality of volumetric scans, the plurality of volumetric scans including one volumetric scan as a series of image slices in each of a plurality of different planes;
    image segmenting each image slice of each of the plurality of volumetric scans into at least a first region and a second region, the first region of each image slice corresponds to a first object of the study object, and the second region of each image slice corresponds to a second object of the study object;
    binning the first region of each image slice of the series of image slices corresponding to the first object to form a first binned object;
    binning the second region of each image slice of the series of image slices corresponding to the second object to form a second binned object; and
    forming a 3 dimensional object of one of the first binned object and the second binned object.

8. A method as claimed in claim 7 wherein the step of binning the first region includes selecting the first region from a first image slice and statistically comparing regions of adjacent image slices to the first region of the first image slice using a comparison of touching regions and at least one of size, and color to designate corresponding first regions in the adjacent image slices.

9. A method as claimed in claim 8 wherein the step of binning the first region includes statistically comparing regions of adjacent image slices of the entire series.

10. A method as claimed in claim 9 wherein the step of statistically comparing regions includes areas of tolerance and binning regions within the areas of tolerance.

11. A method as claimed in claim 10 wherein the areas of tolerance are checked and estimates of errors are calculated and reduced using an algorithm.

12. A method as claimed in claim 11 wherein the algorithm is selected from a group consisting of Mean-Shift comparisons, Nested model comparisons, Fit Indices, Baysian Analyses, Structural Equations Modeling, Hierarchical Partitioning of Variance, Regression analyses, growth-curve analyses, factor analyses, and meta-analytic comparisons.

* * * * *